United States Patent [19]
Meeus et al.

[11] Patent Number: 5,845,585
[45] Date of Patent: Dec. 8, 1998

[54] MOTOR VEHICLE TRAY

[76] Inventors: Emmanuel Meeus, Avenue des Cerisiers 115, B-1200 Brussels; Gontran Stiernon, Nijvelsesteenweg 525, B-1500 Halle, both of Belgium

[21] Appl. No.: 878,771

[22] Filed: Jun. 19, 1997

[30] Foreign Application Priority Data

Jun. 20, 1996 [BE] Belgium ................... 09600569

[51] Int. Cl.⁶ .................................. A47B 23/00
[52] U.S. Cl. ............................. 108/44; 108/165
[58] Field of Search .................. 108/44, 45, 42, 108/152, 165; 224/276, 277

[56] References Cited

U.S. PATENT DOCUMENTS

| | | | |
|---|---|---|---|
| 2,503,602 | 4/1950 | Titley | 108/44 X |
| 3,643,606 | 2/1972 | Vise. | |
| 3,828,994 | 8/1974 | Hollins | 108/44 X |
| 3,952,988 | 4/1976 | Easterly. | |
| 4,915,035 | 4/1990 | Clark et al.. | |
| 4,974,805 | 12/1990 | Douglas. | |
| 5,060,581 | 10/1991 | Malinski. | |
| 5,386,785 | 2/1995 | Naor | 108/44 |
| 5,413,035 | 5/1995 | Fernandez. | |
| 5,558,026 | 9/1996 | Seibert | 108/44 |

FOREIGN PATENT DOCUMENTS

| | | |
|---|---|---|
| 794697 | 5/1973 | Belgium. |
| 906068 | 4/1987 | Belgium. |
| 1932357 | 10/1970 | Germany. |
| 1550899 | 8/1979 | United Kingdom. |
| 2144627 | 3/1985 | United Kingdom. |

*Primary Examiner*—Jose V. Chen
*Attorney, Agent, or Firm*—Sughrue, Mion, Zinn, Macpeak & Seas, PLLC

[57] ABSTRACT

The device with supporting tray adapted for mounting on the steering wheel of a vehicle comprises:

(a) a rigid panel with two parallel folding lines so as to divide the panel in three parts, namely a first central part, a second part with an opening and a third part, the opening being adapted for being moved downwards so that the wheel partly passes through the opening and so that edges of the opening are supported by the wheel, and (b) a link for linking the third part and the first part together so as to maintain the third part substantially horizontal.

13 Claims, 7 Drawing Sheets

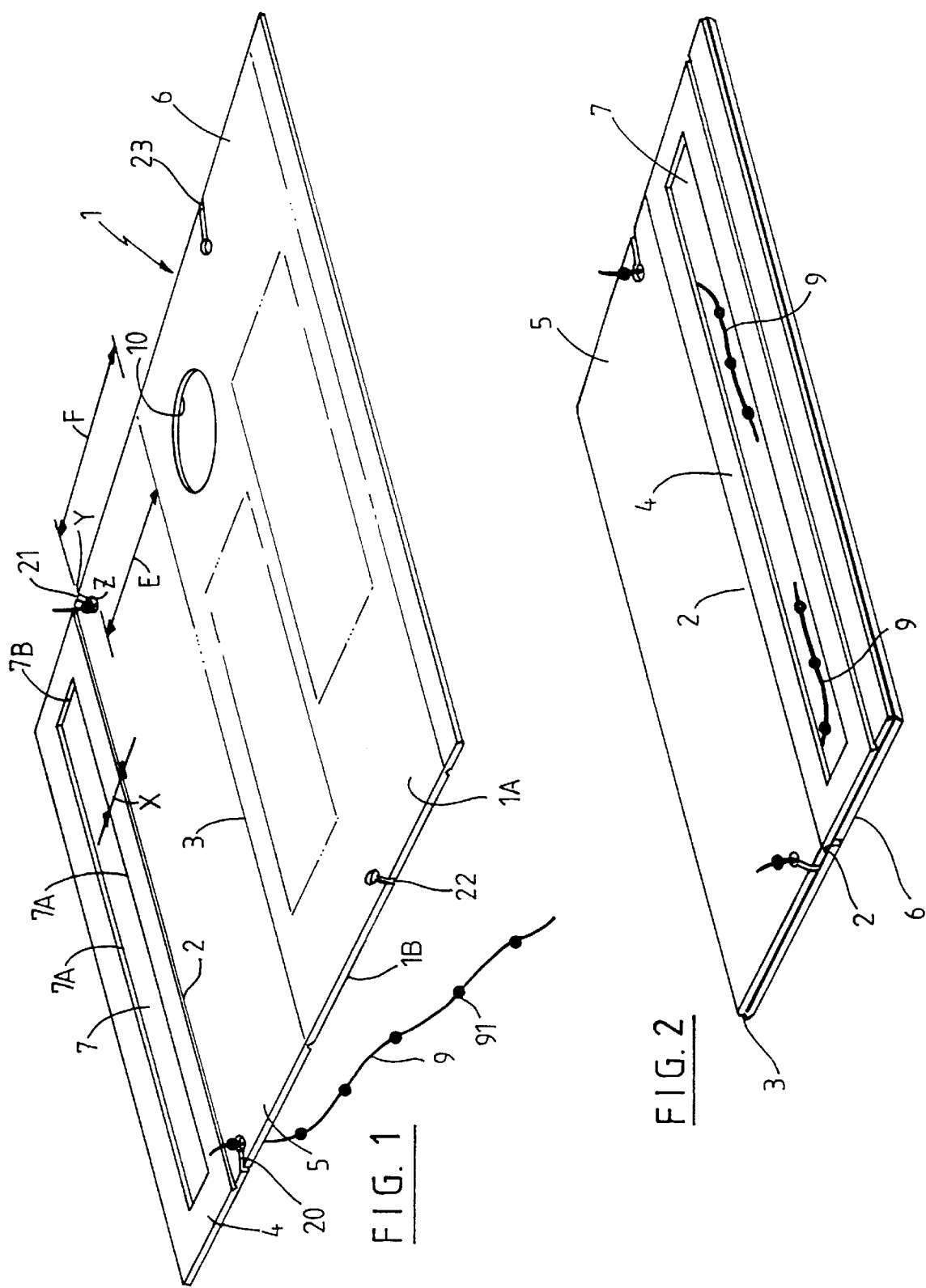

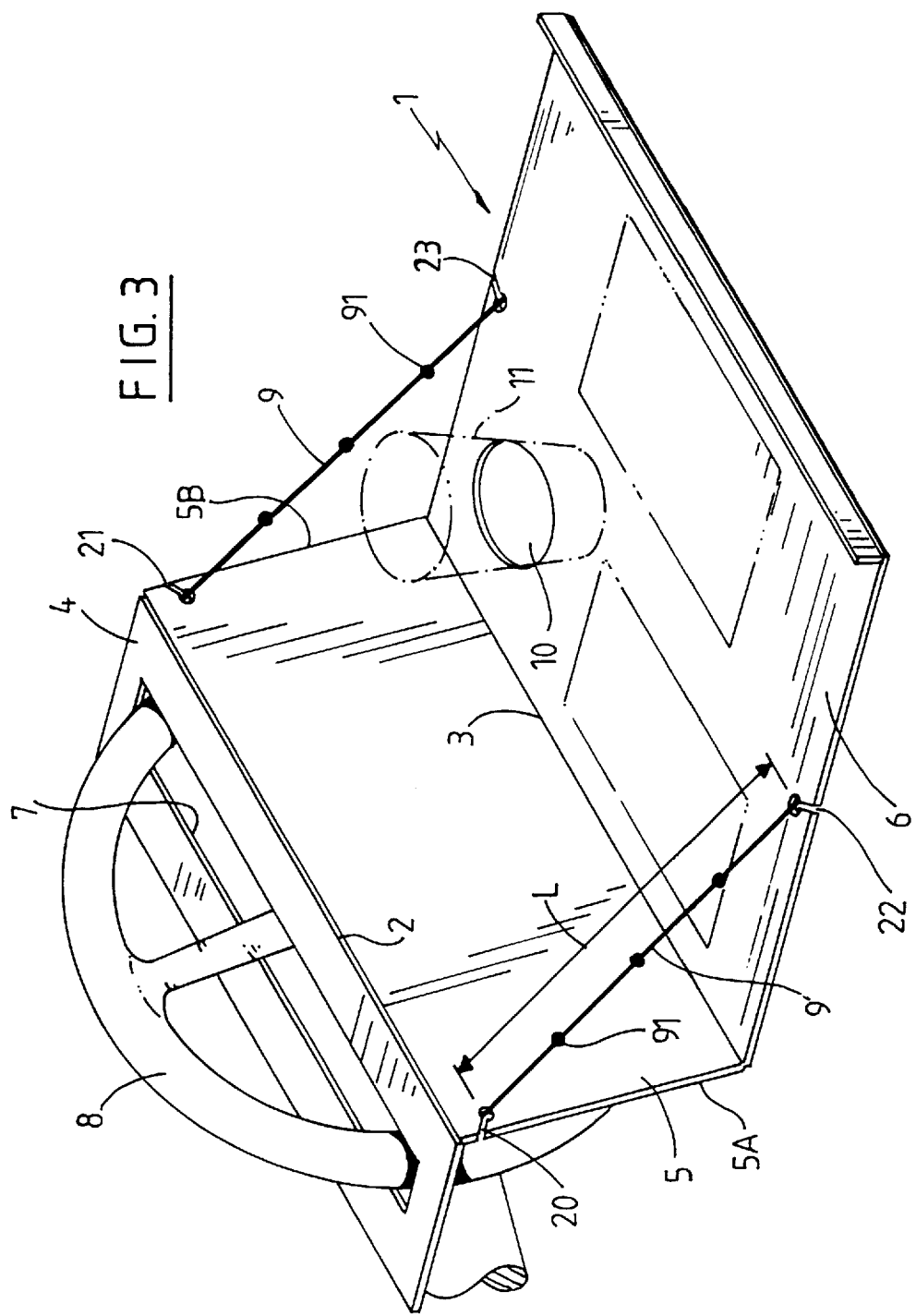

MOTOR VEHICLE TRAY

THE PRIOR ART

Supporting trays adapted for mounting on the wheel of a motor vehicle are known by various documents, among others U.S. Pat. No. 4,915,035, U.S. Pat. No. 3,643,606, U.S. Pat. No. 3,952,988, BE 906,068, BE 794,697.

The tray of U.S. Pat. No. 4,915,035 is provided with two right angle frames slidably engaging the wheel. When the tray is placed on the wheel, the tray is subjected to a pivotment. The said frames need to be sufficiently rigid so as to be able to resist to the forces and moments exerted when placing foods or drinks on the tray. Furthermore, as the upper part of the wheel is very accessible, a high risk exists that people moves the wheel supporting the tray, whereby loss of drinks or foods out of the tray are possible. Such a tray is therefore not stable enough.

The tray of BE 906,068 comprises two plates linked together by means of an articulation and by means of two cords so as to maintain a first plate substantially horizontal when the other plate rests on the wheel. Said other plate is mounted on the wheel by (a) two supporting blocks contacting the wheel and (b) an elastic band. The placement of this tray on a wheel is quite complicated and the elastic band has to be adapted for resisting to the weight of the foods and drinks placed on the first plate.

The present invention has for subject matter a device with supporting tray which can easily be mounted on the steering wheel of a motor vehicle. The supporting tray when mounted on the wheel is stable. Furthermore, in case of inadequate placement of the tray whereby the tray does not extend in a horizontal plane, the tray can easily be moved with respect to the wheel so as to extend in a substantially horizontal plane.

The invention relates to a device with supporting tray adapted for mounting on a substantially circular wheel of a motor vehicle, said device comprising:

(a) a rigid panel with a front face and a back face, the said panel being divided by two parallel traverse folding lines in three parts, namely a first central part extending between the two folding lines, a second part linked to said first part along the first folding line, and a third part linked to said first part along the second folding line, the second part having an substantially rectangular opening, the larger edges thereof having a length lower than the diameter of the wheel, but greater than 15 cm, while the small edges of the opening have a length at least equal to the thickness of the wheel, said opening being adapted to slide along the wheel so that a part of the wheel passes through said opening, whereby the small edges of the opening rest on the wheel and whereby the back face of the first part partly contacts the wheel, and (b) at least one means for linking the third part and the first part together so as to maintain said third part substantially horizontal.

Advantageously, the larger edges of the rectangular opening has a length of at least 20 cm, for example between 20 and 30 cm, more specifically about 25 cm. The small edges of the opening have a length for example from 3 to 7 cm, more specifically about 5 cm.

Advantageously, the opening of the second part is distant from the first folding line, whereby after mounting the second part on the wheel by sliding the opening along said wheel, the back face of the first part only contacts the wheel in the neighbourhood of the second folding line, the part of said back face of the first part adjacent to the first folding line being distant from the wheel.

Preferably, the opening of the second part has a larger edge adjacent to the first folding line, but located at a distance of at least 0.5 cm from said first folding line, whereby after mounting the second part on the wheel by sliding the opening along said wheel, the back face of the first part only contacts the wheel in the neighbourhood of the second folding line, the part of said back face of the first part adjacent to the first folding line being distant from said wheel of at least 0.5 cm.

According to an embodiment, the means for linking the first part and the third part together for maintaining the third part substantially horizontal consists of links provided with means for adjusting the length of the links between the first and the third parts.

According to a specific embodiment, the means for linking the first part and the third part together for maintaining the third part substantially horizontal consists of links provided with stops, the stops of each link co-operating with an opening of the third part so as to adjust the length of the link between the first and the third part.

According to a specific example of device, in which the first part extends between a first lateral edge and a second lateral edge and has a first slot extending from said first lateral edge and a second slot extending from the second lateral edge, the means for linking the third part and the first part together consists of a first cord provided with stops and a second cord provided with stops, each cord being attached to the third part, the first cord being inserted in the first slot so that one stop of the cord abuts against the back face of the first part, while the second cord is inserted in the second slot so that one stop of the cord abuts against the back face of the first part.

According to another specific example of device, in which the third part extends between a first lateral edge and a second lateral edge and has a first slot extending from said first lateral edge and a second slot extending from the second lateral edge, the means for linking the third part and the first part together consists of a first cord provided with stops and a second cord provided with stops, each cord being attached to the first part, the first cord being inserted in the first slot so that one stop of the cord abuts against the back face of the third part, while the second cord is inserted in the second slot so that one stop of the cord abuts against the back face of the third part.

According to still another specific example of device, in which the first part extends between a first lateral edge and a second lateral edge and has a first slot extending from said first lateral edge and a second slot extending from the second lateral edge, and in which the third part extends between a first lateral edge and a second lateral edge and has a first slot extending from said first lateral edge and a second slot extending from the second lateral edge, the means for linking the third part and the first part together consists of a first cord provided with stops and a second cord provided with stops, the first cord being inserted in the first slot of the first part and in the first slot of the third part so that one stop of the cord abuts against the back face of the first part, while another stop of the cord abuts against the back face of the third part, while the second cord is inserted in the second slot of the first part and in the second slot of the third part so that one stop of the cord abuts against the back face of the first part, while another stop of the cord abuts against the back face of the third part.

The folding lines are advantageously formed by a means extending between the two opposite lateral edges of the panel, said means being for example selected from the group consisting of grooves, partial cuttings, cuttings extending partly in the thickness of the panel, rows of holes, and combinations thereof. For example, the first and second folding lines are formed respectively by a first groove extending between the two lateral edges of the panel and a second groove extending between the two lateral edges of the panel, the first groove being located on the front face of the panel, while the second groove is located on the back face of the panel.

Preferably, the slots of the first and/or third part are not parallel to the folding lines and extend between a first end located along one lateral edge of the panel and a second end, the distance separating said second end from the second folding line being lower than the distance separating the first end from the second folding line.

BRIEF DESCRIPTION OF THE DRAWINGS

FIG. 1 is a perspective view of a tray device of the invention;

FIG. 2 is a perspective view of the tray device of FIG. 1, folded in compact position;

FIG. 3 is a perspective view of the tray device of FIG. 1 mounted on a steering wheel;

FIGS. 8 and 9 are views similar to FIG. 1, and show other embodiments of fold lines.

DESCRIPTION OF PREFERRED EMBODIMENTS

Figure 4:
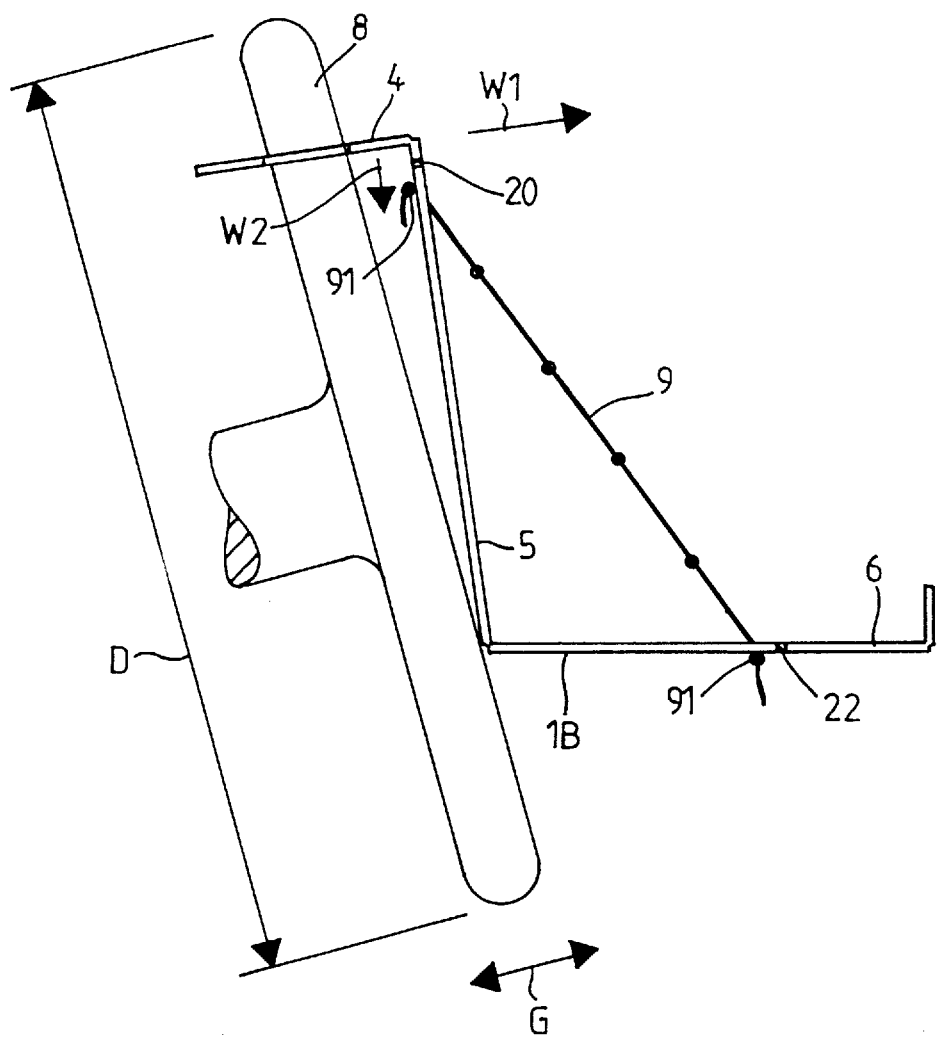
FIG. 4 is a side view of the tray device of FIG. 1 mounted on a steering wheel.

The tray device shown in FIG. 1 has a supporting tray adapted for mounting on a substantially circular steering wheel 8 of a motor vehicle. Said device comprises:

(a) a rigid panel 1 with a front face 1A and a back face 1B, the said panel 1 being divided by two parallel traverse folding lines 2,3 in three parts, namely a first central part 5 extending between the two folding lines 2,3, a second part 4 linked to said first part 5 along the first folding line 2, and a third part 6 linked to said first part 5 along the second folding line 3, the second part 4 having an substantially rectangular opening 7, the larger edges 7A thereof having a length of about 25 cm, said length being however lower than the diameter D of the wheel 8, while the small edges 7B of the opening 7 have a length of about 4 to 6 cm, said length being at least equal to the thickness G of the wheel 8, said opening 7 being adapted to slide along the wheel 8 so that an upper part of the wheel 8 (about ¼ of the wheel in this example) passes through said opening 7, whereby the small edges 7B of the opening 7 rest on the wheel 8 and whereby the back face 1B of the first part 5 partly contacts the wheel 8, and (b) two cords 9 for linking the third part 6 and the first part 5 together so as to maintain said third part 6 substantially horizontal, when the tray device is mounted on a wheel.

The opening 7 of the second part 4 has a larger edge 7A adjacent to the first folding line 2, but located at a distance X of about 2.5 cm from said first folding line 2, whereby after mounting the second part 4 on the wheel 8 by sliding the opening 7 along said wheel 8, the back face 1B of the first part 5 only contacts the wheel 8 in the neighbourhood of the second folding line 3, the part of said back face 1B of the first part 5 adjacent to the first folding line 2 being distant from said wheel 8 of about 2.5 cm.

The cords 9 are provided with stops 91 for adjusting the length L of the parts of the cords extending between the first and the third parts 5,6. Stops 91 of each cord 9 cooperate with slots 20,21,22,23 of the first and third parts 5,6 so as to adjust the length L of the link between the first and the third part.

The first part 5 extends between a first lateral edge 5A and a second lateral edge 5B and has a first slot 20 extending from said first lateral edge 5A and a second slot 21 extending from the second lateral edge 5B, said slots 20,21 being adjacent to the first folding line 2 (for example at a distance of less than 5 cm of said folding line 2). The third part 6 extends between a first lateral edge 6A and a second lateral edge 6B and has a first slot 22 extending from said first lateral edge 6A and a second slot 23 extending from the second lateral edge 6B, said slots being distant from the second folding line of at least 10 cm. A first cord 9 is inserted in the first slot 20 of the first part 5 and in the first slot 22 of the third part 6 so that one stop 91 of the cord 9 abuts against the back face 1B of the first part 5, while another stop 91 of the cord abuts against the back face 1B of the third part 6. A second cord 9 is inserted in the second slot 21 of the first part 5 and in the second slot 23 of the third part 6 so that one stop 91 of the cord 9 abuts against the back face of the first part 5, while another stop 91 of the cord abuts against the back face of the third part 6. By selecting the stops to contact the back face of the first and third part, the length L of links can be adjusted.

The first and second folding lines 2,3 are formed respectively by a first groove 2 extending between the two lateral edges of the panel 1 and a second groove 3 extending between the two lateral edges of the panel, a first groove 2 being located on the front face 1A of the panel, while the second groove 3 is located on the back face 1B of the panel.

The slots 20,21,22,23 are not parallel to the folding lines 2,3 and extend between a first end Y located along one lateral edge of the panel and a second end Z, the distance E separating said second end Z from the second folding line 3 being lower than the distance F separating the first end Y from the second folding line 3. This is advantageous for preventing the removal of the cord out of the slot when the tray device is mounted on the wheel.

The third part 6 can be provided with an opening 10, in which a glass 11 can partly be inserted. Said third part, when positioned in a substantially horizontal plane, is suitable for supporting various elements or pieces, for example a lunch plate, a personal computer, a book, etc.

Due to the fact that the first part only contacts partly the wheel, the risk of a non desired sliding of the second part 4 along the wheel can be prevented. This is due to the fact that the second part 4 is subjected, when mounted on the wheel, to a horizontal force W1 and to a vertical force W2.

Most preferably, the slots 22,23 are located in the neighbourhood of the free end of the part 6, for example at a distance from the second folding line 3 corresponding to more than 50% of the distance separating the free end of the part 6 and the second folding line. Especially, the slots 22,23 are located at a distance from the folding line 3 of more than 66% of the distance between the free end of the part 6 and the second folding line 3.

In the embodiment shown in FIG. 1, the distance between the two folding lines 2 and 3 is lower than the distance between the second folding line and the free end of the part 6. However, in possible embodiments which are advantageous, the distance between the two folding lines 2 and 3 is greater than the distance between the second folding line and the free end of the part 6.

Figure 5:
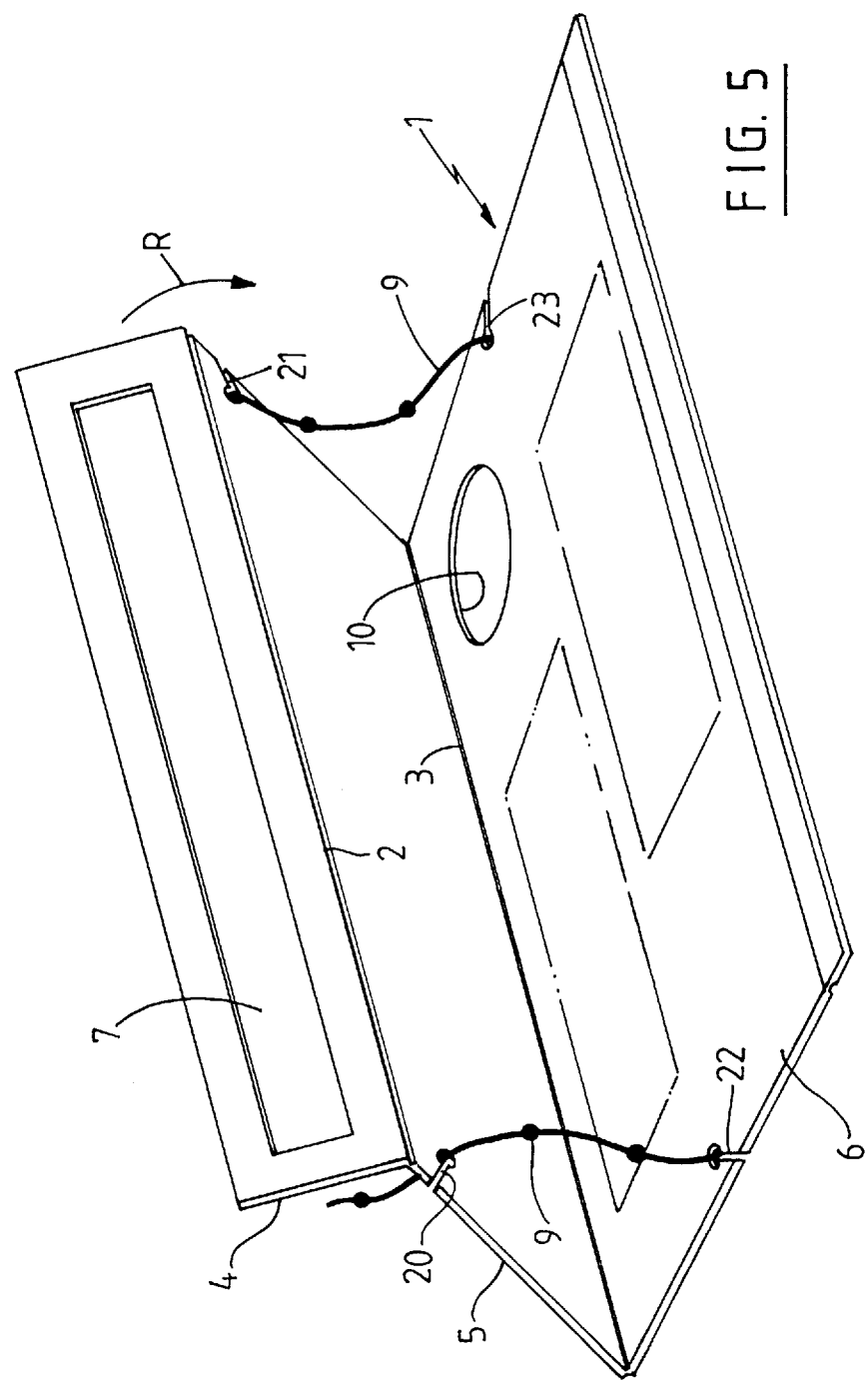
FIG. 5 show the folding of the tray device of FIG. 1.

FIG. 5 shows the folding back (pivotment R) of the tray device of FIG. 3, so as to reach the compact position shown in FIG. 2.

Figure 6:
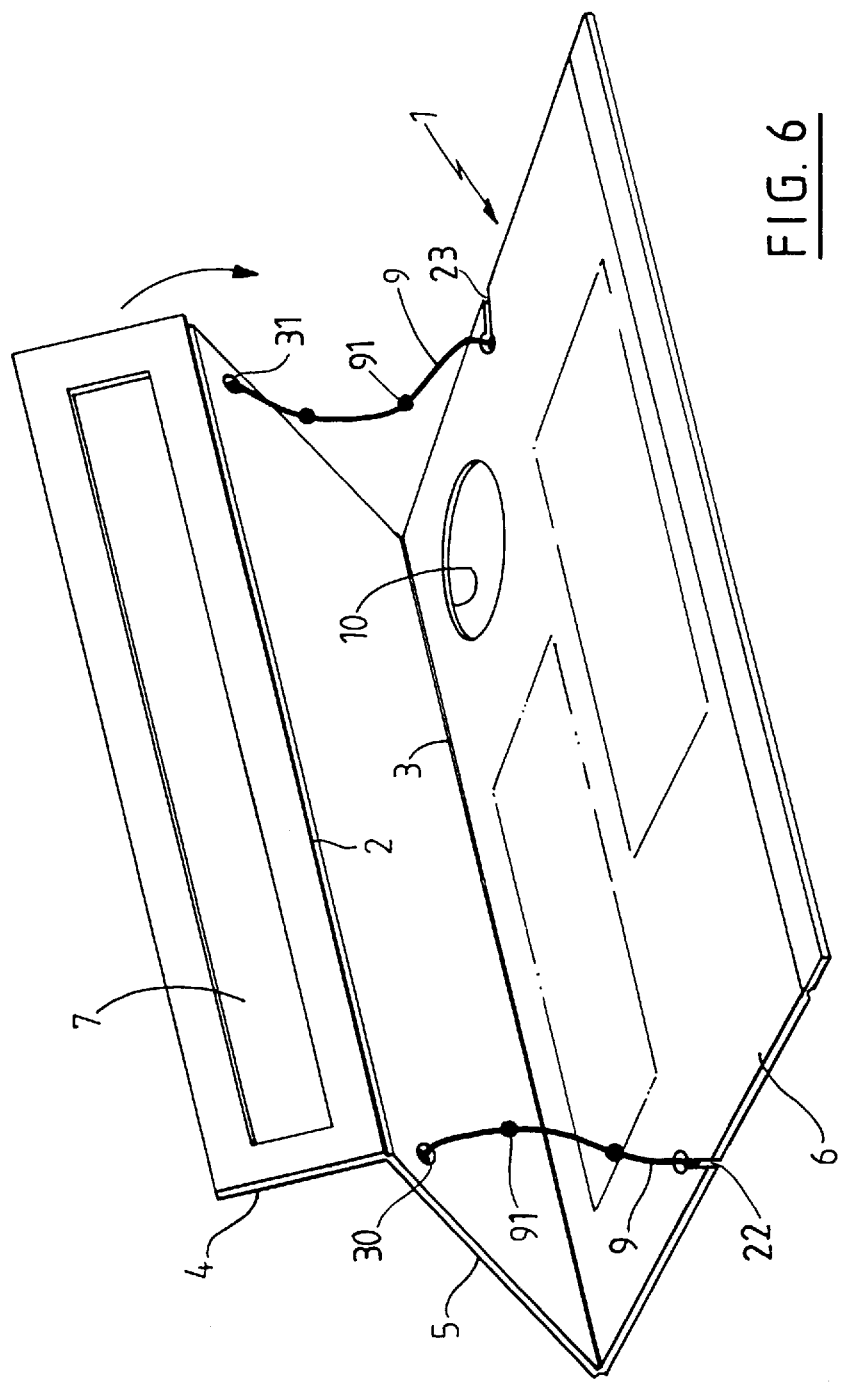
FIGS. 6 and 7 are view similar to FIG. 5, but for other embodiments of tray device of the invention.
Figure 7:
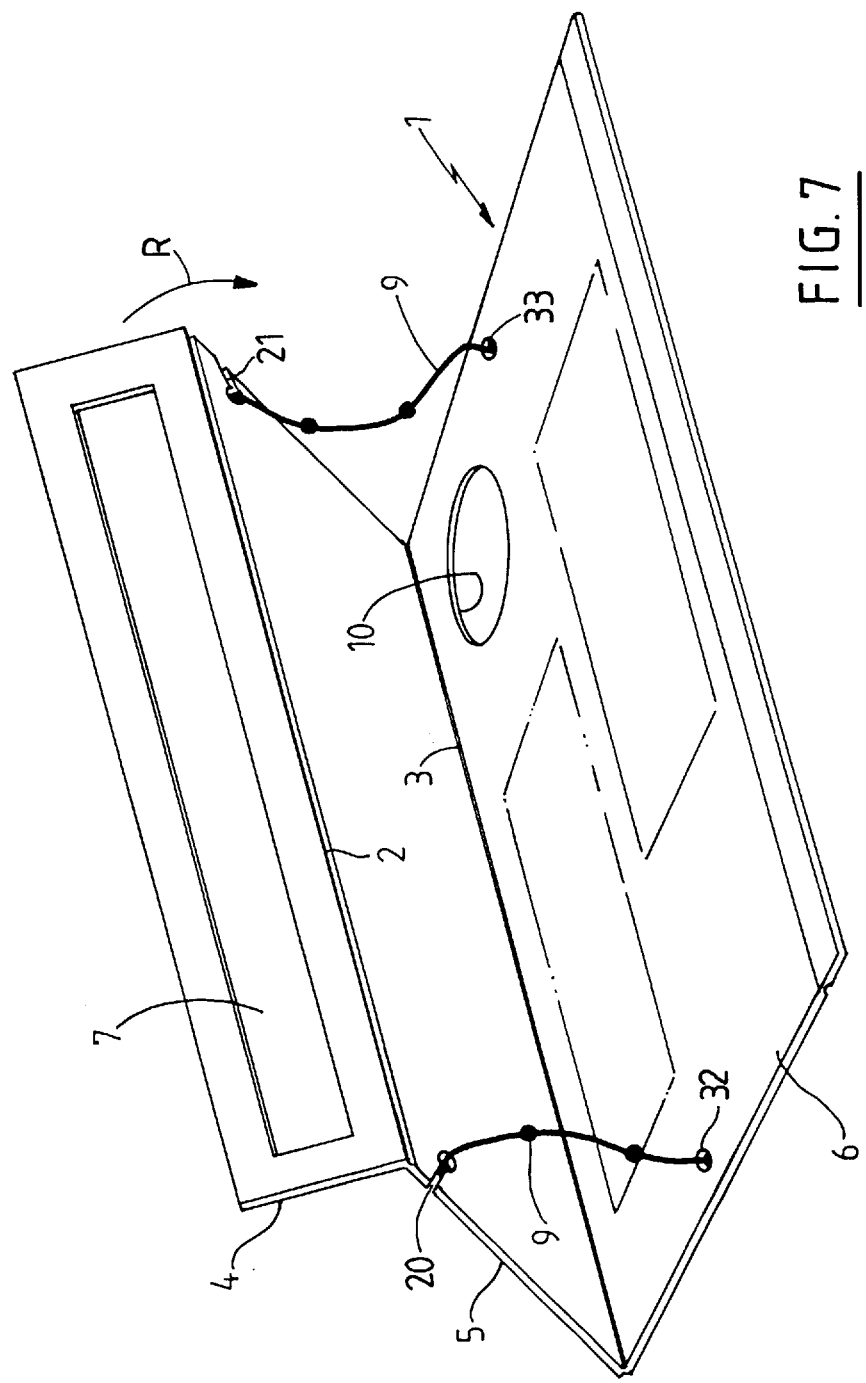

FIGS. 6 and 7 are views of embodiments similar to that shown in FIG. 5, except that in FIG. 6, the slots 20,21 have been replaced by holes 30,31, while in FIG. 7, the slots 22,23 have been replaced by the holes 32,33.

Figure 8:
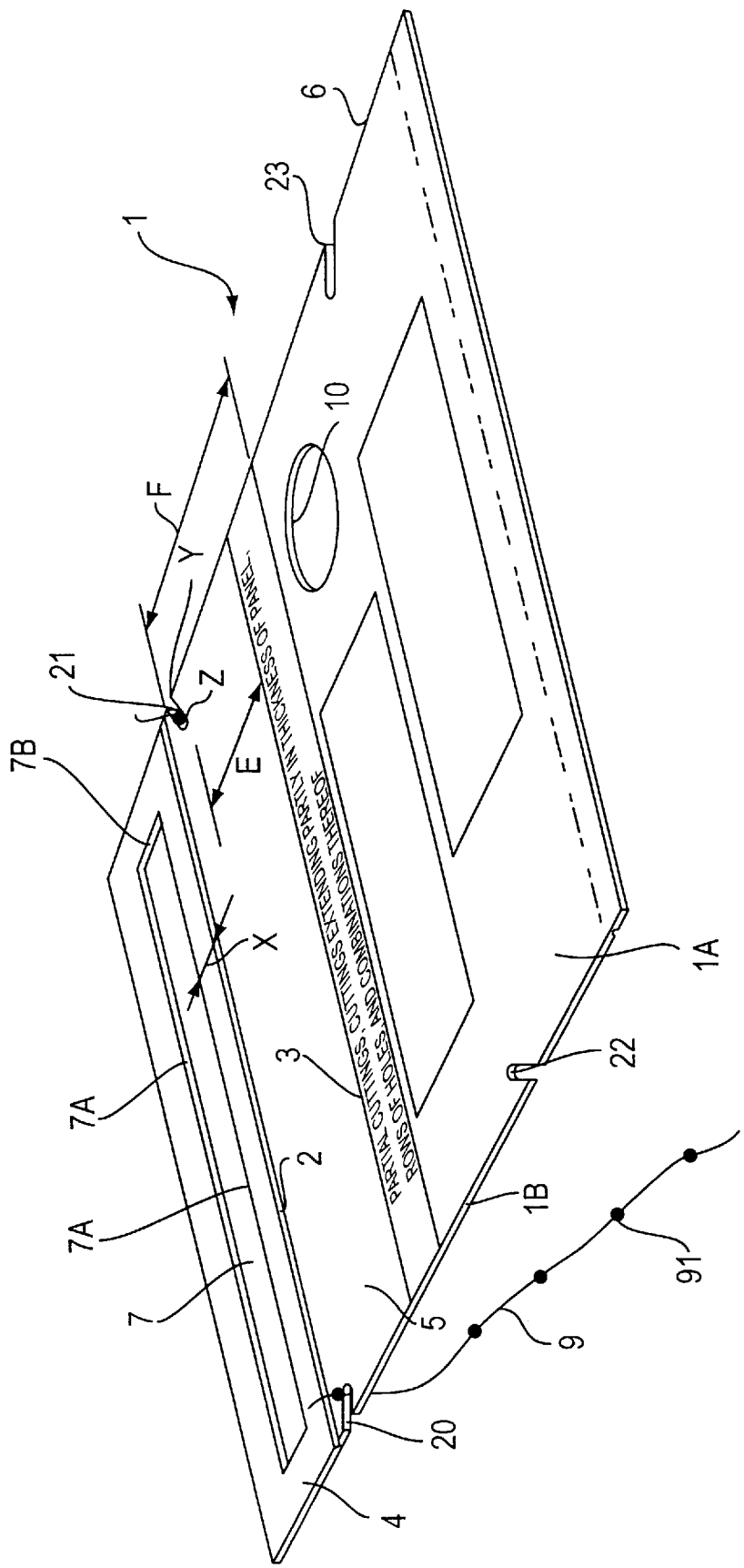

Instead of using grooves for forming the folding lines 2,3, as shown in FIG. 1 it is possible (as shown in FIG. 8 to use partial cuttings, a series of partial cuttings or openings extending through the thickness of the panel, rows of holes, and combinations thereof for forming said folding lines 2,3.

The slots 20,21 ,22,23 are straight in the Figures, however said slots can possibly be curved towards the second folding lines 3.

What we claim is:

1. A device including a supporting tray adapted to be mounted on a substantially circular steering wheel of a motor vehicle, said device comprising:

(a) a rigid panel with a front face and a back face, said panel being divided by two parallel traverse first and second folding lines in three parts, namely a first central part extending between the two folding lines, a second part linked to said first part along the first folding line, and a third part linked to said first part along the second folding line, the second part having an substantially rectangular opening, said opening being adapted to slide along the wheel so that a part of the wheel passes through said opening, whereby the short side edges of the substantially rectangular opening are adapted to rest on the wheel, and whereby the back face of the first part is adapted partly to contact the wheel; and (b) at least one means for linking the third part and the first part together so as to maintain said third part substantially horizontal.

2. The device of claim 1, in which the opening of the second part is distant from the first folding line, whereby after the second part is mounted on the wheel by sliding the opening along said wheel, the back face of the first part is adapted to contact the wheel only in a neighbourhood of the second folding line, the part of said back face of the first part adjacent to the first folding line being adapted to be distant from the wheel.

3. The device of claim 1, in which the opening of the second part has a larger side edge adjacent to the first folding line, but located at a distance of at least 0.5 cm from said first folding line, whereby after the second part is mounted on the wheel by sliding the opening along said wheel, the back face of the first part being adapted to contact the wheel only in a neighbourhood of the second folding line, the part of said back face of the first part adjacent to the first folding line being adapted to be distant from said wheel of at least 0.5 cm.

4. The device of claim 1, in which the means for linking the first part and the third part together for maintaining the third part substantially horizontal consists of links provided with means for adjusting the length of the links between the first and the third parts.

5. The device of claim 1, in which the means for linking the first part and the third part together for maintaining the third part substantially horizontal consists of links provided with stops, the stops of each link co-operating with an opening of the third part so as to adjust the length of the link between the first and the third part.

6. The device of claim 1, in which the first part extends between a first lateral edge and a second lateral edge and has a first slot extending from said first lateral edge and a second slot extending from the second lateral edge, and in which the means for linking the third part and the first part together consists of a first cord provided with stops and a second cord provided with stops, each cord being attached to the third part, the first cord being inserted in the first slot so that one stop of the cord abuts against the back face of the first part, while the second cord is inserted in the second slot so that one stop of the cord abuts against the back face of the first part.

7. The device of claim 6, in which the slots are not parallel to the folding lines and extend between a first end located along one lateral edge of the panel and a second end, the distance separating said second end from the second folding line being lower than the distance separating the first end from the second folding line.

8. The device of claim 1, in which the third part extends between a first lateral edge and a second lateral edge and has a first slot extending from said first lateral edge and a second slot extending from the second lateral edge, and in which the means for linking the third part and the first part together consists of a first cord provided with stops and a second cord provided with stops, each cord being attached to the first part, the first cord being inserted in the first slot so that one stop of the cord abuts against the back face of the third part, while the second cord is inserted in the second slot so that one stop of the cord abuts against the back face of the third part.

9. The device of claim 8, in which the slots are not parallel to the folding lines and extend between a first end located along one lateral edge of the panel and a second end, the distance separating said second end from the second folding line being lower than the distance separating the first end from the second folding line.

10. The device of claim 1, in which the first part extends between a first lateral edge and a second lateral edge and has a first slot extending from said first lateral edge and a second slot extending from the second lateral edge, in which the third part extends between a first lateral edge and a second lateral edge and has a first slot extending from said first lateral edge and a second slot extending from the second lateral edge, in which the means for linking the third part and the first part together consists of a first cord provided with stops and a second cord provided with stops, in which the first cord being inserted in the first slot of the first part and in the first slot of the third part so that one stop of the cord abuts against the back face of the first part, while another stop of the cord abuts against the back face of the third part, and in which the second cord is inserted in the second slot of the first part and in the second slot of the third part so that one stop of the cord abuts against the back face of the first part, while another stop of the cord abuts against the back face of the third part.

11. The device of claim 10, in which the slots are not parallel to the folding lines and extend between a first end located along one lateral edge of the panel and a second end, the distance separating said second end from the second folding line being lower than the distance separating the first end from the second folding line.

12. The device of claim 1, in which the folding lines are formed by a means extending between the two opposite lateral edges of the panel, said means being selected from the group consisting of grooves, partial cuttings, cuttings extending partly in the thickness of the panel, rows of holes, and combinations thereof.

13. The device of claim 1, in which the first and second folding lines are formed respectively by a first groove extending between the two lateral edges of the panel and a second groove extending between the two lateral edges of the panel, the first groove being located on the front face of the panel, while the second groove is located on the back face of the panel.

* * * * *